March 11, 1947. G. E. HANNER 2,417,161
PUSH BUTTON SWITCHING APPARATUS
Filed Sept. 15, 1943 2 Sheets-Sheet 1

INVENTOR.
George E. Hanner
BY
Goodling and Krost
attys

March 11, 1947.                G. E. HANNER                2,417,161
                        PUSH BUTTON SWITCHING APPARATUS
                            Filed Sept. 15, 1943          2 Sheets-Sheet 2
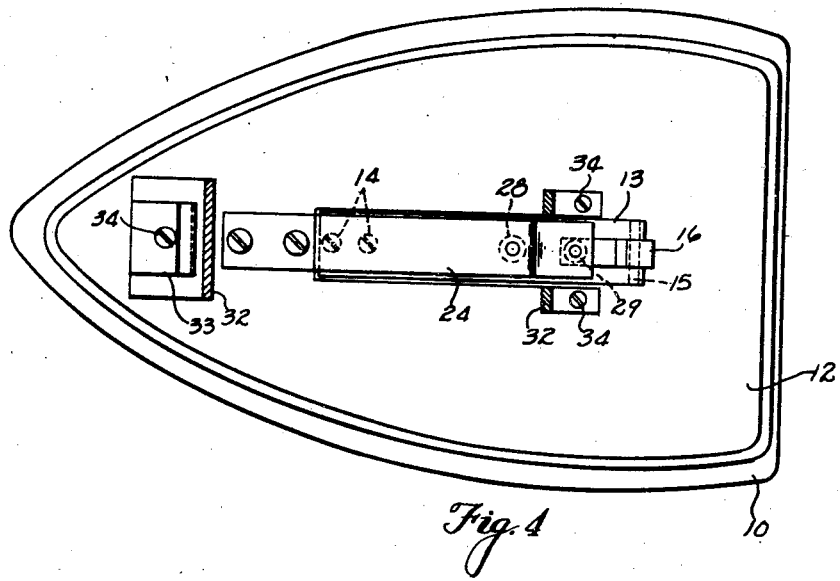
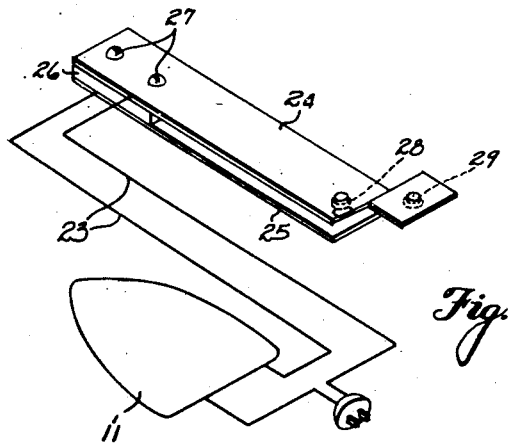
INVENTOR.
George E. Hanner
BY
Stoodling and Kost
attys Patented Mar. 11, 1947

2,417,161

UNITED STATES PATENT OFFICE 2,417,161

PUSH-BUTTON SWITCHING APPARATUS

George E. Hanner, Mansfield, Ohio, assignor to Dominion Electrical Manufacturing, Inc., a corporation of Ohio Application September 15, 1943, Serial No. 502,473

13 Claims. (Cl. 200—138)

My invention relates in general to switching apparatus and more particularly to switching apparatus which is governed by a temperature responsive device and which is set by push button control.

My invention will be described in relation to an electric iron but it is to be understood that my invention applies to electrically heating devices of all kinds which are governed by a temperature responsive device.

An object of my invention is the provision of setting the temperature at which the electrically heated device is operated by push button control.

Another object of my invention is the provision of a motion transmitting means between the temperature responsive device and the switch controlled thereby, in which the motion transmitting means may be modified or moved to change the temperature setting of the temperature responsive actuated switch.

Another object of my invention is the provision of actuating the motion transmitting device for modifying the position thereof and the temperature at which the switch is operated by push button control.

Another object of my invention is the provision of modifying the movements of the temperature responsive device before they are transmitted to the switch controlled thereby by employing a plurality of switch buttons, which when actuated modify the movement which is transmitted to the switch.

Another object of my invention is the provision of a push button control for a thermostatically controlled switch which is simple to manufacture and reliable in operation.

Other objects and a fuller understanding of my invention may be had by referring to the following description and claims, taken in conjunction with the accompanying drawing, in which:

Figure 4 is a view similar to Figure 1 with the push buttons removed and showing principally a plan view of the contact fingers and the thermostat for actuating same; and Figure 5 is a schematic view showing the electrical circuit for the iron.

Figure 1:
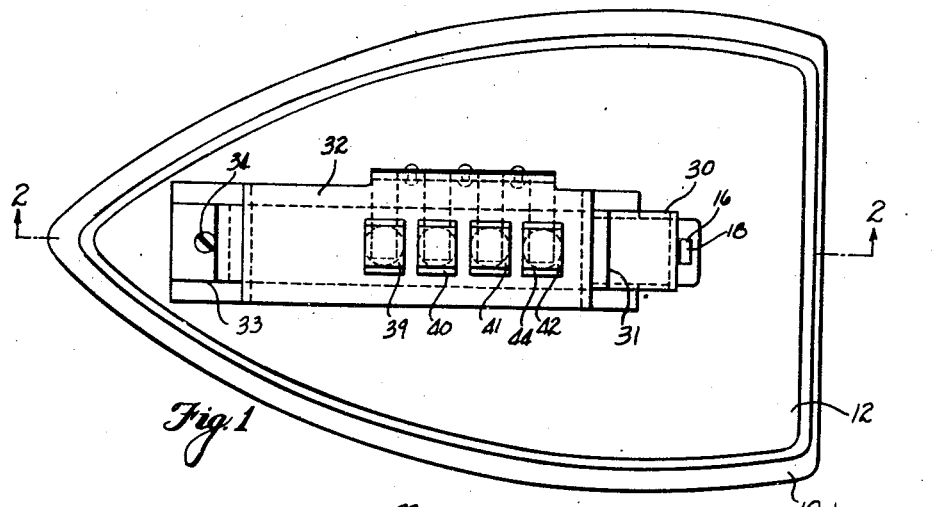
Figure 1 is a plan view of an electric iron embodying the features of my invention with the shell removed to show the features thereof, the thermostat and the switch contact fingers actuated being not shown.
Figure 2:
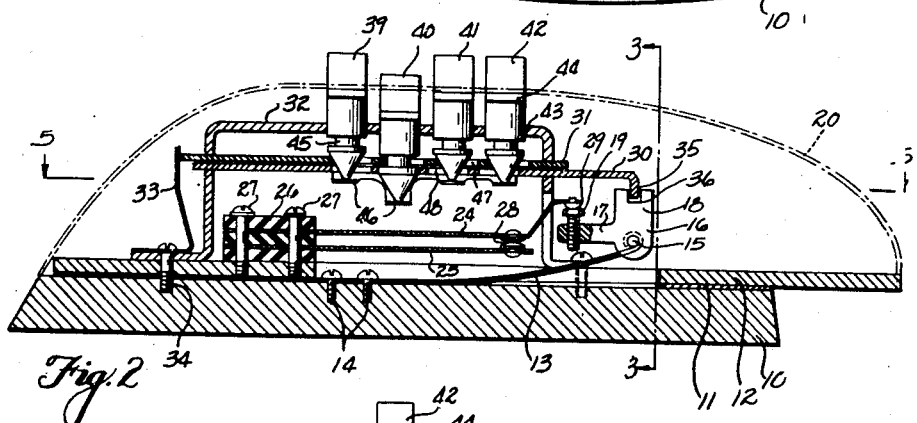
Figure 2 is a cross-sectional view taken along the line 2—2 of Figure 1 which shows the top shell and the thermostat and the switch actuated thereby.
Figure 3:
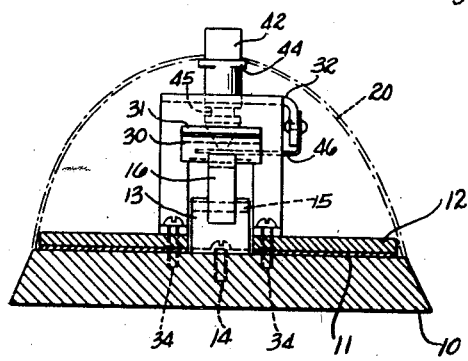
Figure 3 is a cross-sectional view taken along the line 3—3 of Figure 2.

In the drawings, all of the parts of the electric iron which do not influence the push button control, the thermostat or the switch governed thereby are not shown. The sole plate of the iron is designated by the reference character 10 and is electrically heated by a heating element 11 mounted thereon underneath a pressure plate 12. The shell 20 is not shown in Figures 1 and 4 but is shown in Figures 2 and 3 and may be of any conventional shape. In my invention, the thermostat may be of any suitable design and as illustrated I show a bimetallic strip of metal 13 having the left-hand end thereof anchored to the sole plate by means of screws 14 and having the right-hand end thereof arranged to carry a fulcrum pin 15. The bimetallic strip 13 straightens out with a decreasing temperature which means that the fulcrum pin 15 is lowered with decreasing temperatures and is raised with increasing temperatures.

Pivotally connected to the fulcrum pin 15 is a temperature regulating lever 16 having a horizontal arm 17 and a vertical arm 18. The free end of the horizontal arm 17 carries an adjusting screw 19 which engages an insulating button 29 carried by the free end of the upper contact finger 24. Mounted below the upper contact finger 24 is a lower contact finger 25. The contact fingers carry a set of contact points 28 which when opened interrupt the circuit for energizing the heating element and which when closed establishes a circuit for energizing the heating element. The electrical circuit is shown in Figure 5 and when the contacts 28 are closed a circuit is established through the conductor 23 for energizing the electrical heating element 11. The left-hand end of the contact fingers 24 and 25 may be suitably mounted between the insulating mounting blocks 26 which are secured to the pressure plate 12 by means of the screws 27.

The object of the temperature regulating lever 16 is to modify the movements of the thermostat 13 before they are transmitted to the upper contact finger 24. The modification in the position of the temperature regulating lever 16 changes the location of the upper contact finger 24 with the result that the necessary distance for the thermostat 13 to travel to open and close the contact points 28 is accordingly shifted. A change in the temperature of the iron is varied by simply modifying the position of the temperature regulating lever 16. In my invention, I provide for modifying the position of the temperature regulating lever 16 by means of a slidable temperature regulating bar 30 which has a downwardly extending hook provided on the right-hand end thereof which bodily fits into a slot 36 carried by the upper end of the vertical arm 18 of the temperature regulating lever 16. The temperature regulating bar 30 is slidably mounted in a bridge bracket 32 which has its ends suitably connected to the pressure plate and the sole plate by means of screws 34. Positioned above the temperature regulating bar 30 is a locking bar 31 which is constrained towards the rear of the iron by means of a spring 33 which is fastened under the screw 34 that holds the left-hand end of the bridge bracket 32 to the pressure plate 12 and the sole plate 10. The transverse movement of the temperature regulating bar 30 is governed by a plurality of switch buttons 39, 40, 41 and 42 which are slidably guided in guide holes 43 provided in the upper bridge portion of the bridge bracket 32. The push buttons are also vertically guided by holes provided in the shell 20 of the iron. The holes in the shell 20 and the holes 43 in the bridge bracket 32 are in vertical alignment. Each of the push buttons is provided with a shoulder 44 and a groove 45. The shoulder 44 prevents the push button from being pushed up through the openings in the shell 20 under the biasing action of finger springs 46 carried by the bridge bracket 32. The locking bar 31 is provided with a plurality of spaced holes 47 through which the lower end of the push buttons may be depressed. When any one of the push buttons is forced down into one of the holes in the locking bar, the locking bar will be forced into the recess of the depressed push button under the force of the spring 33. The depressed push button will be held down in the depressed position until another push button is depressed when the previously depressed push button will return to its upper position. The temperature regulating bar 30 is provided with a plurality of spaced holes 48 and the holes are so spaced in relation to the push button that when the push buttons are pushed down in a given order of sequence beginning from one end and going to the other end, the temperature regulating bar 30 is progressively moved in a lateral direction a predetermined distance each time that a succeeding push button is depressed. The more that the temperature regulating bar is urged to the left the higher the temperature setting, and the more that the bar is pushed to the right the lower the setting of the temperature at which the switch contact point 28 operates. As illustrated, the push button 39 is arranged to urge the temperature regulating bar 30 farther to the left when depressed and thus may be designated as the high temperature push button. The push button 42 is arranged to urge the temperature regulating bar 43 farthest to the right and may be thus designated as the low temperature push button. The push buttons 40 and 41 may be designated as intermediate temperature push buttons, with the push button 40 giving a higher temperature than the push button 41. Therefore, the order of sequence in operating the push buttons to give successive lower temperatures is from 39, 40, 41 and 42. It is, therefore, very simple to change the temperature of the iron by simply pressing down the desired push button which is a quick operation. The movement of the fulcrum pin 15 is in substantially a vertical direction so that the relationship between the hook 35 on the temperature regulating bar 30 and the slot 36 is such as to not materially affect the temperature setting of the switch as the thermostat 13 moves up and down.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In an electrically heated device having a temperature responsive device, the improvement of switching apparatus for controlling the electrically heated device, said improvement comprising a switch adapted to open and close a circuit to the electrically heated device, motion transmitting means actuated by said temperature responsive device for controlling the switch, and means for modifying the motion transmitting means to change the temperature at which the means is operated, said motion transmitting means comprising an extension lever interconnecting the temperature responsive device and the switch, said lever being pivotally connected to the temperature responsive device and having an arm extending therefrom, said modifying means actuating the arm and changing the temperature at which the switch is operated, said modifying means comprising a slidably mounted member having spaced portions and spaced push buttons engaging the spaced portions, each said spaced push buttons upon respectively engaging the spaced portions slidably moving the slidably mounted member to modify the extension lever.

2. In an electrically heated device having a temperature responsive device, the improvement of switching apparatus for controlling the electrically heated device, said improvement comprising a switch having contact members adapted to open and close a circuit to the electrically heated device, motion transmitting means actuated by said temperature responsive device for controlling the switch, and means for modifying the motion transmitting means to change the temperature at which the switch is operated, said motion transmitting means comprising an extension lever swingably mounted on the temperature responsive device and adapted to operate the switch by operating one of said contacts relative to the other, said modifying means permitting the temperature responsive device to bodily move said extension lever and operate the said one contact in direct response to the movement of the temperature responsive device, said modifying means moving the swingably mounted extension lever with reference to one of the contact members independently of any movement transmitted thereto by the temperature responsive device.

3. In an electrically heated device having a temperature responsive device, the improvement of switching apparatus for controlling the electrically heated device, said improvement comprising a switch having contact members adapted to open and close a circuit to the electrically heated device, a swingably mounted extension member actuated by said temperature responsive device and disposed to operate said switch by operating one of said contacts relative to the other contact, selected position holding means to hold said swingably mounted extension member in a selected position relative to said temperature responsive device, said selected position holding means permitting the said temperature responsive device to bodily move said extension member and operate the said one contact in direct response to the movement of the temperature responsive device, and means to move said selected position holding means, whereby said swingably mounted extension member may be swung relative to one of said switch contact members and change the temperature at which said one of the contacts is operated relative to the other by the temperature responsive device.

4. In an electrically heated device having a temperature responsive device, the improvement of switching apparatus for controlling the electrically heated device, said improvement comprising a switch having contact members adapted to open and close a circuit to the electrically heated device, a swingably mounted extension member actuated by said temperature responsive device and disposed to operate said switch by operating one of said contacts relative to the other contact, selected position holding means to hold said swingably mounted extension member in a selected position relative to said temperature responsive device, said selected position holding means permitting the said temperature responsive device to bodily move said extension member and operate the said one contact in direct response to the movement of the temperature responsive device, and means including push button means to move said selected position holding means, whereby said swingably mounted extension member may be swung relative to one of said switch contact members and change the temperature at which said one of the contacts is operated relative to the other by the temperature responsive device.

5. In an electrically heated device having a temperature responsive device, the improvement of switching apparatus for controlling the electrically heated device, said improvement comprising a switch adapted to open and close a circuit to the electrically heated device, motion transmitting means actuated by said temperature responsive device for controlling the switch, and means for modifying the motion transmitting means to change the temperature at which the switch is operated, said motion transmitting means comprising a substantially L-shaped lever having first and second leg portions with said first leg portion thereof disposed to operate said switch and the second leg portion disposed to engage said means for modifying the motion transmitting means, said L-shaped lever being actuatable by said temperature responsive device to move said first leg portion to operate said switch, and said modifying means moving the second leg portion to modify the position of the first leg portion with reference to the switch substantially independently of any movement transmitted thereto by the temperature responsive device.

6. A slidably mounted bar to operate a switch mechanism, a locking bar positioned above said slidably mounted bar, means to constrain said locking bar in a lateral direction relative to said slidably mounted bar, a plurality of individual control buttons mounted for slidable movement in a direction substantially vertical to said slidably mounted bar and said locking bar, said buttons having interlocking surfaces thereon to be engaged by said locking bar, said locking bar having a plurality of interlocking surfaces to engage said button interlocking surfaces, said slidably mounted bar having a plurality of spaced cam abutting surfaces in spaced relation to the push buttons, whereby the buttons may be depressed relative to said locking bar and slidably mounted bar in a given sequence of order to progressively contact said cam abutting surfaces and move the slidably mounted bar in a lateral direction a predetermined distance each time a succeeding button is depressed, and whereby said locking bar may be constrained laterally to engage said button interlocking surfaces and hold said buttons in said depressed condition.

7. In a temperature responsive switching apparatus for controlling an electrically heated device, the improvement of modifying means to control the switching apparatus, said modifying means comprising a temperature regulating bar to contact said switching apparatus, and push button means to actuate said bar in lateral direction to modify said switching apparatus, said temperature regulating bar having a series of cam abutting surfaces, said push button means comprising a series of push buttons having cam surfaces thereon to contact said temperature regulating bar cam abutting surfaces and closely interfitting surfaces on said push button and said temperature regulating bar to maintain said temperature regulating bar in a substantially fixed position when a push button is engaged therewith, whereby the said push buttons may be depressed and laterally move said bar, and thereafter holds said bar in a fixed position.

8. Position adjusting apparatus, comprising at least a first and a second button means having cam surfaces thereon, and a movable member having at least a first and second cam abutting surface thereon, each said button means cam surface being adapted to contact one of said movable member cam abutting surfaces and move said movable member into a predetermined position, each said button means being adapted to move said movable member into a different predetermined position, and closely interfitting cooperating surfaces on said push-button means and said movable member, whereby said push-button means will hold said movable member in substantially a fixed position when said push button is in contact therewith.

9. Position adjusting apparatus, comprising at least a first and a second button means having cam surfaces thereon, and a movable member having at least a first and second cam abutting surface thereon, each said button means cam surface being adapted to contact one of said movable member cam abutting surfaces and move said movable member into a predetermined position, each said button means being adapted to move said movable member into a different predetermined position, and lock means to hold said buttons in a depressed condition with the cam surface of the button in contact with the cam abutting surface of the movable member, and closely interfitting cooperating surfaces on said push-button means and said movable member, whereby said push-button means will hold said movable member in substantially a fixed position when said push button is held in said depressed condition.

10. In an electrically heated device having a temperature responsive device, the improvement of switching apparatus for controlling the electrically heated device, said improvement comprising a switch having contact members adapted to open and close a circuit to the electrically heated device, a swingably mounted extension member actuated by said temperature responsive device and disposed to operate said switch by operating one of said contacts relative to the other contact, selected position holding means to hold said swingably mounted extension member in a selected position relative to said temperature responsive device, said means to hold said swingably mounted extension member comprising a slidably mounted bar having engagement surfaces with said extension member but permitting said temperature responsive device to bodily move said extension member and operate the said one contact in direct response to the movement of the temperature responsive device, said slidably mounted bar having at least a first and second cam abutting surface thereon, at least a first and second button means having cam surfaces thereon, each said button means cam surface being adapted to contact one of said slidably mounted bar cam abutting surfaces and move said slidably mounted bar into a predetermined position, each said button means being adapted to move said slidably mounted bar into a different predetermined position, whereby said swingably mounted extension member may be swung relative to one of said switch contact members and change the temperature at which said one of the contacts is operated relative to the other by the temperature responsive device.

11. In an electrically heated device having a temperature responsive device, the improvement of switching apparatus for controlling the electrically heated device, said improvement comprising a switch adapted to open and close a circuit to the electrically heated device, motion transmitting means actuated by said temperature responsive device for controlling the switch, and means for modifying the motion transmitting means to change the temperature at which the switch is operated, said motion transmitting means comprising an extension lever interconnecting the temperature responsive device and the switch, said lever being pivotally connected to the temperature responsive device and having an arm extending therefrom, said modifying means actuating the arm independently of said temperature responsive device to one of a series of predetermined positions relative to said switch, said predetermined positions determining the temperature at which the arm will contact and operate the switch, said modifying means comprising a slidably mounted member having spaced portions and spaced push buttons engaging the spaced portions, each said spaced push buttons upon respectively engaging the spaced portions slidably moving the slidably mounted member to modify the extension lever, and closely interfitting cooperating surfaces on said push-button and said slidably mounted member, whereby said push-button will hold said slidably mounted member in substantially a fixed position when said push-buttons are in contact therewith.

12. In an electrically heated sad iron, having a sole plate and an outer shell with a heating element to heat said sole plate, the provision of improved temperature control apparatus, said improved apparatus comprising, a switch having contact members adapted to open and close a circuit to energize said heating element, a thermostat having a free end mounted to move in response to changes in temperature of said sole plate, an extension lever swingably mounted on said free end of the thermostat and actuated thereby, said extension lever being disposed to operate said switch by operating one of said contacts relative to the other contact, a slidably mounted bar having interconnecting surfaces with said extension lever to hold said extension lever in a selected position relative to said other of the contacts, said thermostat serving to bodily move the extension lever and operate the said one contact in direct response to the movement of the thermostat, said slidably mounted bar having at least a first and second cam abutting surface thereon, at least a first and second button means having cam surfaces thereon, said button means being manually operable, each said button means cam surface being adapted to contact one of said slidably mounted bar cam abutting surfaces and move said slidably mounted bar into a predetermined position, each said button means being adapted to move said slidably mounted bar into a different predetermined position, whereby said extension lever may be swung on said thermostat free end to change the temperature at which the said switch contacts are operated by the body movement of said extension lever and closely interfitting cooperating surfaces on said at least a first and second button means and said slidably mounted bar, whereby said button means will hold said movable member in substantially a fixed position when said button means is in contact therewith.

13. In an electrically heated device having a temperature responsive device, the improvement of switching apparatus for controlling the electrically heated device, said improvement comprising a first switch member and a second switch member, said second switch member being movable relative to said first switch member to open and close a circuit to the electrically heated device, motion transmitting means actuated by said temperature responsive device for moving said second switch member relative to said first switch member, and means for modifying the motion transmitting means to change the temperature at which the said first and second switch member open and close the circuit, said motion transmitting means comprising an extension lever swingably mounted on the temperature responsive device and adapted to engage the said second switch member, said modifying means swinging the extension lever with reference to the said second switch member independently of any movement transmitted thereto by the temperature responsive device.

GEORGE E. HANNER.

REFERENCES CITED

The following references are of record in the file of this patent:

UNITED STATES PATENTS

| Number | Name | Date |
| --- | --- | --- |
| 1,864,455 | Mazzie | June 21, 1932 |
| 2,288,175 | Almquist et al. | June 30, 1942 |
| 1,517,681 | Lucey | Dec. 2, 1924 |
| 1,779,950 | Browning | Oct. 28, 1930 |